United States Patent [19]

Ziogas et al.

[11] Patent Number: 4,556,937
[45] Date of Patent: Dec. 3, 1985

[54] DC-AC POWER CONVERTER INCLUDING TWO HIGH FREQUENCY RESONANT LINK CONVERTERS

[75] Inventors: Phiovos D. Ziogas, Brossard, Canada; V. Thathachary T. Ranganathan, Madras, India

[73] Assignee: Canadian Patents and Development Limited, Ottawa, Canada

[21] Appl. No.: 539,178

[22] Filed: Oct. 5, 1983

[51] Int. Cl.⁴ ............................................. H02M 5/04
[52] U.S. Cl. ......................................... 363/8; 363/71; 363/132
[58] Field of Search ................... 363/8, 25, 41, 17, 98, 363/132, 136, 157, 159, 162, 71

[56] References Cited

U.S. PATENT DOCUMENTS 3,151,915 10/1964 Graybeal ................................ 363/39
3,514,688 5/1970 Martin .................................... 363/20
3,742,336 6/1973 Bedford .................................. 363/8

FOREIGN PATENT DOCUMENTS 584415 12/1977 U.S.S.R. ................................ 363/98

OTHER PUBLICATIONS

Ranganathan et al., "A Regulated DC-DC Voltage Source Converter Using a High Frequency Link", IEEE Trans. Ind. Appl., V. IA-18, pp. 279-287, May '82.
Gyugyi et al., "The High-Frequency Base Converter", IEEE Trans. Ind. Appl., v. IA-15, No. 4, pp. 420-429, Jul./Aug. 1979.
Espelage et al., "High-Frequency Link Power Conversion," IEEE Trans. Ind. Appl., v. IA-13, pp. 388-394, Sep. '77.
Mayham, "SCR Inverter with Good Regulation and Sine-Wave Output," IEEE Trans. Ind. Appl., v. IGA-3, pp. 176-187, Mar./Apr. 1967.

Primary Examiner—Peter S. Wong
Assistant Examiner—D. L. Rebsch
Attorney, Agent, or Firm—Schwartz, Jeffery, Schwaab, Mack, Blumenthal & Evans

[57] ABSTRACT

A DC to low frequency AC power conversion system includes two high frequency link inverters and a cycloconverter. DC input is fed to the high frequency links in parallel, and the outputs of the links are fed to a subtractor. The output of the subtractor is then fed to the cycloconverter. The difference between the first high frequency and the second high frequency of twice the respective frequency links is equal to the low frequency.

3 Claims, 11 Drawing Figures

WAVEFORMS OF LINK VOLTAGE AND
LOAD CURRENT AS SEEN BY LINK.

OUTPUT CURRENT $I_o$ AND WANTED COMPONENT
$V_{ow}$ OF OUTPUT VOLTAGE OVER ONE HALF-CYCLE.

PHASOR DIAGRAMS AT VARIOUS INSTANTS.

DC-AC POWER CONVERTER INCLUDING TWO HIGH FREQUENCY RESONANT LINK CONVERTERS

BACKGROUND OF INVENTION (a) Field of the Invention

The invention relates to a DC to low frequency AC power conversion system. More specifically, the invention relates to such a system which uses two parallel high frequency link stages.

(b) Description of Prior Art

Prior art static power converters which incorporate a variable high frequency link stage are well known in the art. Such converters offer several advantages, such as simple commutation, reduced size of magnetic and reactive components, and fast response. Load commutated resonant converters with sinusoidal output voltage are usually employed to realize the high frequency link. The link frequency is typically of the order of a few kiloHertz. Low frequency (60 Hz) output power is obtained from the high frequency link through typical cycloconversion methods. See, for example, U.S. Pat. No. 3,742,336, June 26, 1973, B. D. Bedford, "Versatile cycloinverter power circuits"; P. M. Espelage and B. K. Bose, "High-frequency link power conversion", IEEE Trans. Ind. Appl., Vol. IA-13, pp. 388-394, September/October 1977; and L. Gyugyi and F. Cibulka, "The high frequency base converter—a new approach to static high-power conversion", IEEE Trans. Ind. Appl., Vol. IA-15, pp. 420-429, July/August 1979.

In using cycloconversion methods for power conversion, the input to the cycloconverter is typically of a constant amplitude. Under such conditions, the firing angle α of the cycloconverter has to be modulated about a quiescent value, using a sinusoidal reference signal, in order to achieve a sinusoidal output voltage. However, if the input to the cycloconverter were amplitude modulated, then the firing angle would not have to be modulated. In such a case, a sinusoidal output voltage could be constructed by simple rectification/inversion. This process could be viewed as a form of cycloconversion in which the modulation process is incorporated in the input voltage instead of the switching.

To accomplish such an input, one can employ, in accordance with the invention, two HF link circuits such that the difference between the operating frequencies of the two link circuits is twice the required output frequency. The difference between the two link voltages is a high freqency sinusoid enveloped within another sinusoid at the low output frequency.

It is of course known in the art to combine the outputs of two frequency generators or the like to obtain a difference frequency as is shown, for example, in U.S. Pat. No. 3,151,915, Oct. 6, 1964, Graybeal. However, this approach has not been used in static power converters, nor has it been used as an input to a cycloconverter.

SUMMARY OF INVENTION

It is therefore an object of the invention to provide a DC to low frequency AC power conversion system.

It is a more specific object of the invention to provide such a system using a cycloconverter in which the input to the cycloconverter is amplitude modulated.

It is an even more specific object of the invention to provide such a system which uses two parallel high frequency link stages to produce such an amplitude modulated input to the cycloconverter.

In accordance with a particular embodiment of the invention, there is provided a DC to low frequency AC power conversion system. The system includes a first high frequency link inverter operating at a first high frequency and a second high frequency link inverter operating at a second high frequency. Also provided are DC input means, subtractor means having two input terminals and an output terminal, and cycloconverter means. The first and second inverters are connected in parallel to the DC input means at the input ends thereof, and to the input terminals of the subtractor means at the output ends thereof. The output terminal of the subtractor means is connected to the cycloconverter. The difference in magnitude between the first high frequency and the second high frequency is equal to twice the low frequency.

BRIEF DESCRIPTION OF DRAWINGS

The invention will be better understood by an examination of the following description together with the accompanying drawings in which.

DESCRIPTION OF PREFERRED EMBODIMENTS

Figure 1:
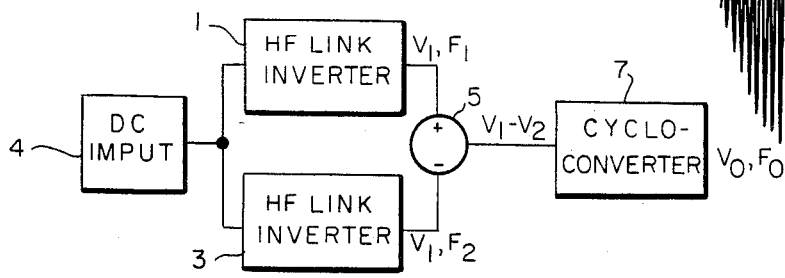
FIG. 1 is a block diagram of a DC to AC power converter using two parallel high frequency links.

Referring to FIG. 1, a power conversion system in accordance with the invention comprises high frequency link inverters 1 and 3 connected in parallel. At the input end, the link inverters are connected to a DC power source 4, and at the other end, the outputs of the inverters are connected to a subtractor 5. The output of the subtractor is connected to cycloconverter 7.

As seen in FIG. 1, the difference between the two link voltages, i.e., the output of the subtractor 5, is a high freqency sinusoid enveloped within another sinusoid at the low frequency output. The frequency at the output of the cycloconverter is equal to the desired low frequency (i.e., 50 Hz or 60 Hz), and is equal to one-half the difference of the link inverter frequencies.

Figure 2:
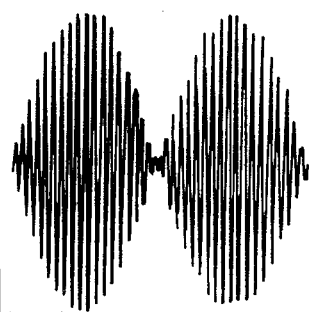
FIG. 2 is a schematic diagram of a converter for obtaining low frequency AC from high frequency AC sources.

Turning to FIG. 2, which presents a circuit which is to be used below in the circuit analysis of the converter, 9 and 11 are idealized voltage sources. The idealized voltage sources are used to evaluate the responses of the high frequency link inverters.

The cycloconverter 7 comprises switch means 13, 15, 17 and 19. The switch means are illustrated only in schematic form. As will be appreciated, the switch means will normally comprise controllable semi-conductor switches.

The switches are under the control of a controller 21. Such controllers are well known in the art.

The output of the conversion system is fed to a load 23.

Figure 4:
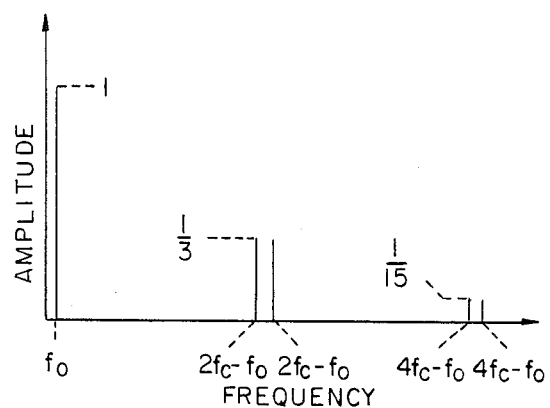
FIG. 4 is a frequency spectrum of the signal at the ouput of the cycloconverter.

Turning now to FIG. 4, the spectrum illustrates quite clearly the frequency separation between the low frequency output and the link inverter frequencies. Accordingly, it can be seen that filtering out the unwanted components at the output of the cycloconverter will constitute a relatively simple task using a simple filter arrangement.

Figure 5:
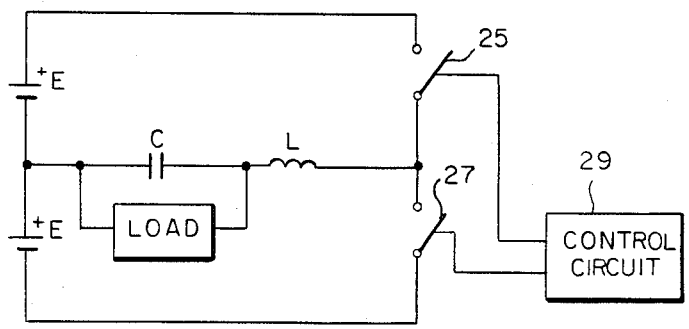
FIG. 5 is a circuit diagram of a high frequency link inverter in accordance with the invention.

FIG. 5 illustrates a signle link inverter in accordance with the invention. The link inverter comprises a capacitor C and an inductor L, which elements determine the resonant frequency of the inverter. The inverter also includes switch means 25 and 27 which, once again, are preferably controllable semi-conductor switches. The switches 25 and 27 are under the control of a controller 29.

The switches are controlled, as well known in the art, to alter the switching frequency of the inverter such that the output frequency of the inverter is equal to the resonant frequency+an offset component determined by the switching. The altering of frequencies by controlled switching is well known in the art as described, for example, in Mapham, N., "An SCR inverter with good regulation and sine-wave output", IEEE Trans. Ind. Gen. Appl., Vol. IGA-3, pp. 176-187, March/April 1967, and Ranganathan, V. T. Ziogas, P. D. and Stefanovic, V.R., "A regulated dc-dc voltage source converter using a high frequency link", IEEE Trans. Ind. Appl., Vol. IA-18, No. 3, pp. 279-287, May/June 1982.

Figure 6:
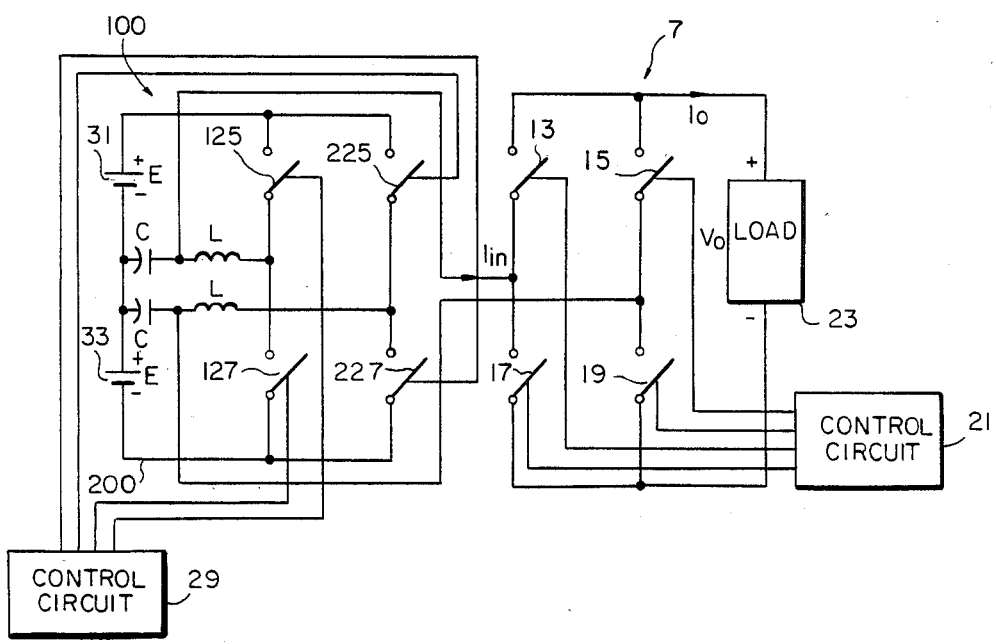
FIG. 6 is a circuit diagram of the complete converter system in accordance with the invention.

FIG. 6 illustrates schematically a circuit diagram in accordance with the invention. The first link inverter is referenced as 100 while the second link inverter is referenced as 200. 125 and 127 are the switches of inverter 100 while 225 and 227 are the switches of inverter 200. The values of L and C in the inverters are identical, so that the resonant frequency of the inverters is the same.

Control means 29 controls all of the switches 125, 127, 225 and 227, and DC sources 31 and 33 are fed, respectively, to the input of inverter 100 and 200.

The cycloconverter consists of the same elements as illustrated in FIG. 2 above.

In order to understand the operation of the inventive system, we consider first two sinusoidal high frequency voltage sources operating at frequencies $f_c+f_o$ and $f_c-f_o$. $f_c$ is the mean of the operating frequencies of the two inverters while $f_o$ is the offset frequency, as well as the required low output frequency. As seen in FIG. 2, $f_c$ is very much greater than $f_o$.

The output voltages of the inverters can be represented by the idealized voltage sources, as illustrated in FIG. 2, which are represented by the equations:

$$V_1 = V_m \sin(\omega_c + \omega_o)t$$

$$V_2 = V_m \sin(\omega_c - \omega_o)t \qquad (1)$$

where $\omega_c = 2\pi f_c$ and $\omega_o = 2\pi f_o$. Their difference is therefore given by $$V_3 = V_1 - V_2 = V_m \sin(\omega_c + \omega_o)t - V_m \sin(\omega_c - \omega_o)t \qquad (2)$$

i.e. $V_3 = 2V_m \cos \omega_c t \sin \omega_o t \qquad (3)$

Figure 3A:
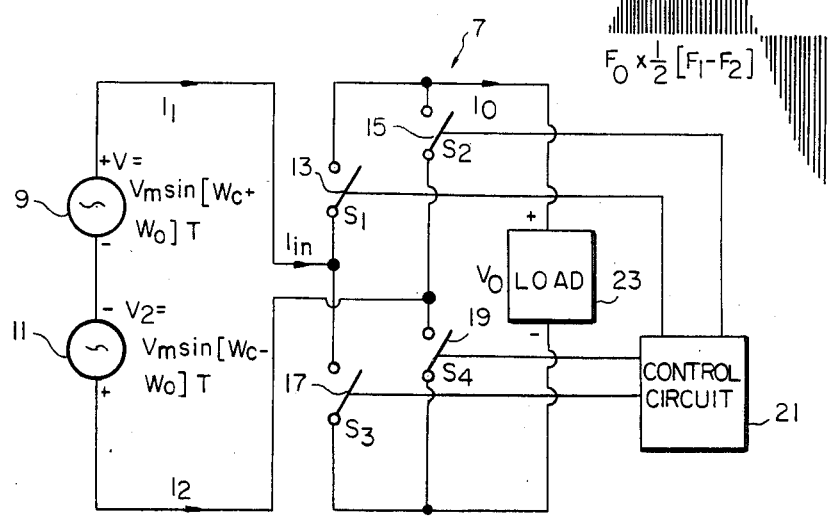
FIGS. 3A and 3B are waveforms at the output of the link inverters and cycloconverter, respectively.
Figure 3A:
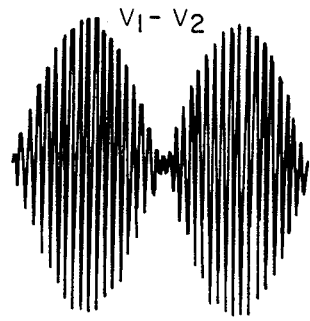
Figure 3B:
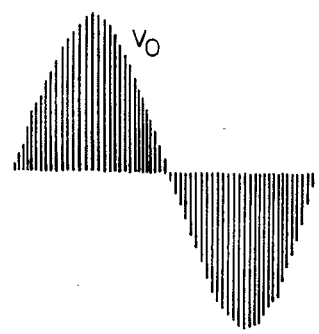

Equation (3) represents an alternating voltage at the high frequency $f_c$ whose amplitude follows the low frequency envelope described by $2V_m \sin \omega_o t$. The nature of this waveform is shown in FIG. 3A. The required output voltage $V_o$ at the low frequency $f_o$ can be obtained by suitably inverting alternate half-period of the voltage in FIG. 3A, resulting in the voltage waveform shown in FIG. 3B.

The frequency components in the output voltage waveform $V_o$ can be obtained in the following manner. The process of obtaining the output voltage is equivalent to multiplying the expression in (2) by a square wave $V_s$ of unit amplitude, in phase with $\cos \omega_c t$. Since such a square wave has a Fourier series expansion of the form $$V_s = \sum_{\substack{n=1 \\ n \text{ odd}}}^{\infty} (-1)^{\frac{n-1}{2}} \cdot \frac{4}{\pi n} \cos n\omega_c t \qquad (4)$$

the output voltage $V_o$ can be expressed as $$V_o = V_3 \times V_s$$

$$= (V_m\sin(\omega_c + \omega_o)t - V_m\sin(\omega_c - \omega_o)t) \cdot$$

$$\left( \sum_{\substack{n=1 \\ n \text{ odd}}}^{\infty} (-1)^{\frac{n-1}{2}} \cdot \frac{4}{\pi n} \cos n\omega_c t \right)$$

(5a)

$$\therefore V_o = \frac{4V_m}{\pi} \sin\omega_o t + \frac{2V_m}{\pi} \sin(2\omega_c + \omega_o)t \left( \frac{1}{1} - \frac{1}{3} \right) -$$

$$\frac{2V_m}{\pi} \sin(2\omega_c - \omega_o)t \left( \frac{1}{1} - \frac{1}{3} \right) -$$

$$\frac{2V_m}{\pi} \sin(4\omega_c + \omega_o)t \left( \frac{1}{3} - \frac{1}{5} \right) +$$

$$\frac{2V_m}{\pi} \sin(4\omega_c - \omega_o)t \left( \frac{1}{3} - \frac{1}{5} \right) + \ldots$$

(5b)

$$V_o = \frac{4V_m}{\pi} \sin\omega_o t = \sum_{n=1}^{\infty} (\sin(2k\omega_c + \omega_o)t - \sin(2k\omega_c - \omega_o)t) \cdot$$

$$(-1)^k \frac{2V_m}{\pi} \cdot \left( \frac{1}{2k-1} - \frac{1}{2k+1} \right)$$

Equation (5b) shows that the voltage $V_o$ has a component at frequency $f_o$ of amplitude $4V_m/\pi$, this being the required output voltage. The spectrum of the output voltage is shown in FIG. 4. It can be seen that the first pair of unwanted frequency components in the output occur at the frequencies $2f_c+f_o$ and $2f_c-f_o$. Since $f_o$ is of the order of 60 Hz while $f_c$ is of the order of 6 KHz, the unwanted components can be easily filtered.

While the amplitude of each of the voltage sources $V_1$ and $V_2$ is $V_m$, the amplitude of the wanted frequency component in the voltage $V_o$ constructed from the difference of $V_1$ and $V_2$ is $4V_m/\pi$ instead of $2V_m$, as may be expected ideally. This may be regarded as a derating in voltage, computed as:

$$\text{Voltage derating} = \frac{4V_m}{\pi} / 2V_m = \frac{2}{\pi} = .637 \quad (6)$$

Let $\theta$ be the phase angle of the load at the output frequency $f_o$. The load current $i_o$ (FIG. 2) can be expressed in the form $i_m \sin(\omega_o t - \theta)$ assuming that there is sufficient inductance in the load to smooth out ripple currents. The input current $i_{in}$ of the cycloconverter in FIG. 2 can then be obtained by the same method that was employed to obtain the expression for the output voltage $V_o$ i.e. by multiplying the output current $i_o$ by a square-wave of unit amplitude in phase with $\cos \omega_c t$. The resulting expression is:

$$i_{in} = \frac{2i_m}{\pi}(\sin((\omega_c + \omega_o)t - \theta) - \sin((\omega_c - \omega_o)t + \theta)) - \quad (7)$$

$$\frac{2i_m}{3\pi}(\sin((3\omega_c + \omega_o)t - \theta) - \sin((3\omega_c - \omega_o)t + \theta)) +$$

$$\frac{2i_m}{5\pi}(\sin((5\omega_c + \omega_o)t - \theta) - \sin((5\omega_c - \omega_o)t + \theta)) - \ldots$$

From this expression the active powers supplied by the two sources are seen to be the same. From (1) and (7).

Active power supplied by each source $$= \frac{1}{2} \cdot V_m \cdot \frac{2i_m}{\pi} \cdot \cos \theta \quad (8)$$

$$= \frac{V_m i_m}{\pi} \cos \theta$$

From the expression for the output current $i_o$ and the expression (5b) for output voltage $V_o$.

Active power absorbed by the load $$= \frac{1}{2} \cdot \frac{4V_m}{\pi} \cdot i_m \cdot \cos \theta \quad (9)$$

$$= \frac{2V_m i_m}{\pi} \cos \theta$$

Thus each source supplies half the total active power demanded by the load. The apparent power handled by each source can be obtained as follows:

$$\text{RMS voltage of each source} = \frac{V_m}{\sqrt{2}} \quad (10)$$

$$\text{RMS current in each source} = \frac{i_m}{\sqrt{2}} \quad (11)$$

Hence, apparent power handled by each source $$= \frac{V_m i_m}{2} \quad (12)$$

From (8) and (12).
Power factor at which each source operates $$= \frac{V_m i_m \cos \theta}{\pi} \div \frac{V_m i_m}{2} \quad (13)$$

$$= \frac{2}{\pi} \cos \theta$$

From (13) it can be seen that the best power fact at which each source can operate is $2/\pi = 0.637$.

Operating Conditions for the Link Inverters

Figure 7:
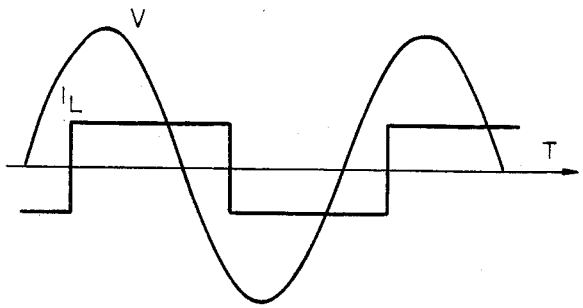
FIG. 7 illustrates waveforms of link voltage and load current as seen by the link.

Since the output current $i_o$ (FIG. 6) is alternating at an angular frequency $\omega_o$ which is very much less than $\omega_c$, the magnitude of $i_o$ can be assumed to be constant over one cycle at the frequency of either link. Therefore the current reflected into the links by the output cycloconverter can be represented by a square-wave over one cycle at the link frequency, as illustrated by FIG. 7. The magnitude of this reflected load current follows the magnitude of the output current $i_o$ and varies cyclically at a frequency $2f_o$ because the positive and negative half-cycles at the output of the cycloconverter give rise to the same current amplitude variations at the input.

Moreover, while the link voltages are alternating at the frequencies $f_c \pm f_o$, the load current seen by the links alternates at a slightly different frequency $f_c$.

Consequently the reflected load current "slips" past the link voltages. The phase angle at which the links see the load current therefore varies from one cycle of the link frequency to the next. These variations repeat cyclically at the frequency $2f_o$. For a given load phase angle $\theta$ at the output, the range of phase angles over which the links see the load current can be established as follows.

Figure 8:
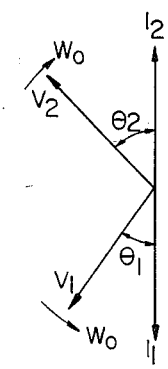
FIG. 8 is a phasor diagram showing link voltage and load currents seen by the links.

Following the notation in FIG. 2, the link voltages $V_1$ and $V_2$ and the load currents $i_1$ and $i_2$ of the two links obtained by reflecting the load current $i_o$ can be represented by a phasor diagram as shown in FIG. 8.

The frame of reference in FIG. 8 is assumed to rotate at frequency $f_c$. Since $i_1$ and $i_2$ are alternating at the frequency $f_c$, their phasors are stationary. Furthermore, the phase difference between $i_1$ and $i_2$ is always 180° because of the polarity conventions indicated in FIG. 2. The two link voltages $V_1$ and $V_2$ are alternating at frequencies $f_c + f_o$ and $f_c - f_o$ respectively. Therefore the phasor representing $V_1$ moves anti-clockwise at a rate of $\omega_o$ radians/sec., while the phasor representing $V_2$ moves clockwise at the same rate. $\theta_1$ and $\theta_2$ are the phase angles at which the two link voltages see the load current.

Figure 9:
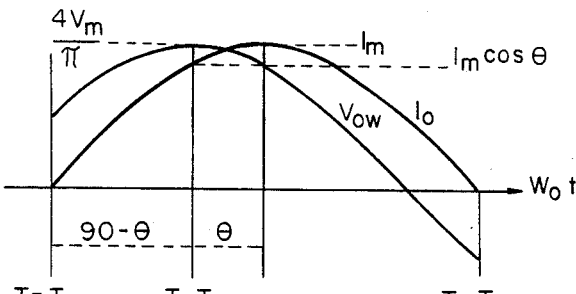
FIG. 9 shows output current $i_o$ and the wanted component $V_{ow}$ of output voltage over a half-cycle.

Consider the half-cycle of the output represented by the interval from one load current zero to the next. Waveforms of the output current and wanted component of output voltage are shown in FIG. 9, where a lagging load has been assumed. Since the link frequencies are very much higher than the output frequency, the instantaneous power $P_0$ at the output at any instant can be taken to equal the average power supplied over a cycle at the link frequency at that instant. The wanted component $V_{ow}$ of the output voltage is obtained from equation (5b) as $$V_{ow} = \frac{4V_m}{\pi} \sin \omega_o t \quad (14)$$

Also, $i_o = i_m \sin(\omega_o t - \theta) \quad (15)$

Therefore, instantaneous power $p_0$ at the output is $$p_0 = \frac{1}{2} \cdot 4V_m/\pi \cdot i_m (\cos \theta - \cos(2\omega_o t - \theta)) \quad (16)$$

The average powers p₁ and p₂ supplied over a cycle by the two links are given by:

$$p_1 = \tfrac{1}{2} \cdot V_m \cdot 4i_o/\pi \cdot \cos\theta_1 \quad (17)$$

$$p_2 = \tfrac{1}{2} \cdot V_m \cdot 4i_o/\pi \cdot \cos\theta_2 \quad (18)$$

The factor $(4/\pi)$ in (17) and (18) accounts for the fundaumental component of the square current wave of amplitude $i_o$. At any instant we have:

$$p_0 = p_1 + p_2 \quad (19)$$

Consider the instant $t_2$ in FIG. 9, when the wanted component voltage $V_{ow}$ has its peak value $4V_m/\pi$. At this instant, the two phasors $V_1$ and $V_2$ are 180° out of phase. Since the currents $i_1$ and $i_2$ are always 180° out of phase, the two phase angles $\theta_1$ and $\theta_2$ are equal at this instant. Consequently, $p_1 = p_2 = \tfrac{1}{2}p_0$. Now, at $t=t_2$, $\omega_o t = \pi/2$. From (16).

$$p_0 = \tfrac{1}{2} \cdot 4V_m/\pi \cdot i_m \cdot 2\cos\theta \quad (20)$$

Also, $i_o = i_m \cos\theta$ and from (17) and (18).

$$p_1 = \tfrac{1}{2} \cdot V_m \cdot 4/\pi \cdot i_m \cos\theta \cdot \cos\theta_1 \quad (21)$$

$$p_2 = \tfrac{1}{2} \cdot V_m \cdot 4/\pi \cdot i_m \cos\theta \cdot \cos\theta_2 \quad (22)$$

Figure 10:
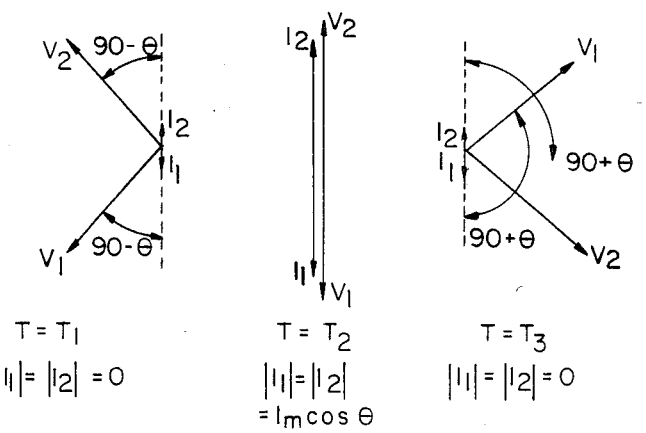
FIG. 10 illustrates phasor diagrams at various instants.

From (20), (21) and (22), using the fact that $\theta_1 = \theta_2$ and $p_1 = p_2 = \tfrac{1}{2}p_0$, we get $\theta_1 = \theta_2 = 0$. Thus, at the instant when $V_{ow}$ attains its peak the phase angles $\theta_1$ and $\theta_2$ seen by the two links are zero, irrespective of the load phase angle $\theta$. Once this is established, the phase relationships at other instants such as $t_1$ and $t_3$ can be deduced. Corresponding phasor diagrams are shown in FIG. 10.

It can be seen that, for a lagging power factor angle $\theta$ at the output, the phase angle seen by the link volage $V_1$—operating at the frequency $(f_c + f_o)$—varies from $90 - \theta$ leading to $90 + \theta$ lagging; the phase angle seen by the link voltage $V_2$—operating at the frequency $(f_c - f_o)$—varies from $90 - \theta$ lagging to $90 + \theta$ leading. At $t = t_3$ the output current $i_o$ reverses polarity. Therefore the two currents $i_1$ and $i_2$ change in phase by 180° and the cycle repeats again.

It can be seen that the output voltage can be regulated by varying the link switching frequencies and so long as the frequency difference remains constant, the output (envelope) frequency is not affected. The output voltage is obtained from the difference of the two link volages by appropriate action of the cycloconverter.

The main consideration in the design of the link inventers is the selection of the values of L and C to obtain commutation under all operating conditions, and the rating of the reactive elements and the switching elements. In general, it is advantageous to select the minimum capacitor value that will ensure commutation, so that the resonant current in the inverter is the minimum required. The inverter performance can be analyzed by writing the solutions to the circuit differential equations and matching the boundary conditions at the beginning and end of a half cycle of inverter operation. Such analysis, for different phase angles for the reflected load current at the link capacitor terminals, indicates that the most demanding operating condition from the point of view of commutation is when the load is maximum and in phase with link voltage, i.e., when the load can be regarded as an uncontrolled (diode) rectifier.

The amplitudes of the link inverter voltage and the resonant current in the inverter are dependent on the magnitude of the reflected load current at the link terminals as well as its phase angle. In general, the amplitudes decrease for lagging phase angles and increase for leading phase angles for a given amplitude of the reflected load current. Since the phase as well as the magnitude of the low current seen by the link varies cyclically as explained above, the voltage and current ratings of the circuit components have to be decided taking this aspect into account.

Although a particular embodiment has been described, this was for the purpose of illustrating, but not limiting, the invention. Various modifications, which will come readily to the mind of one skilled in the art, are within the scope of the invention as defined in the appended claims.

We claim:
1. A DC to low frequency AC power conversion system, comprising:
   a first high frequency link inverter operating at a first high frequency;
   a second high frequency link inverter operating at a second high frequency;
   DC input means;
   subtractor means having two input terminals and an output terminal; and
   cycloconverter means;
   said first and second inverters being connected in parallel to said DC input means at the input ends thereof, and to the input terminals of said subtractor means at the ouput ends thereof;
   the output terminal of said subtractor means being connected to said cycloconverter;
   the difference in magnitude between said first high frequency and said second high frequency being equal to twice said low frequency.
2. A system as defined in claim 1 wherein each said high frequency link inverter comprises an inductor and a capacitor for setting the resonant frequency of said inverters;
   switch means;
   control means;
   said switch means being under the control of said control means whereby to offset the resonant frequency so that the output frequency of each inverter is offset from the said resonant frequency.
3. A system as defined in claim 2 wherein said cycloconverter comprises:
   switch means; and
   a second controller;
   said switch means being under the control of said second controller whereby to rectify/invert the input to said cycloconverter.

* * * * *